Figure 1:
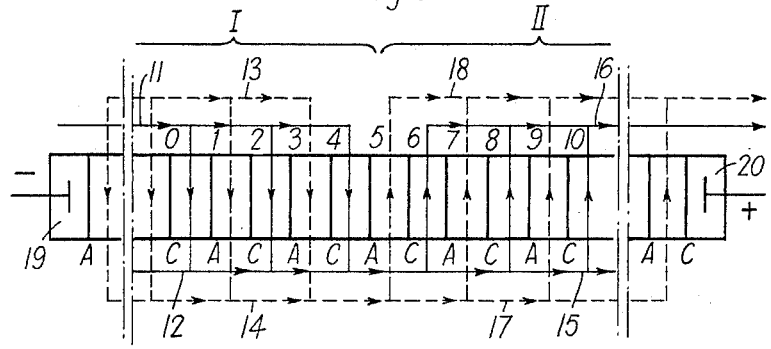

July 24, 1962　　　F. L. TYE　　　3,046,211
ELECTRODIALYSING CELLS
Filed Dec. 21, 1959　　　3 Sheets-Sheet 1

Inventor
FRANK LAURENCE TYE
By
Bailey, Stephenson & Huxley
Attorneys

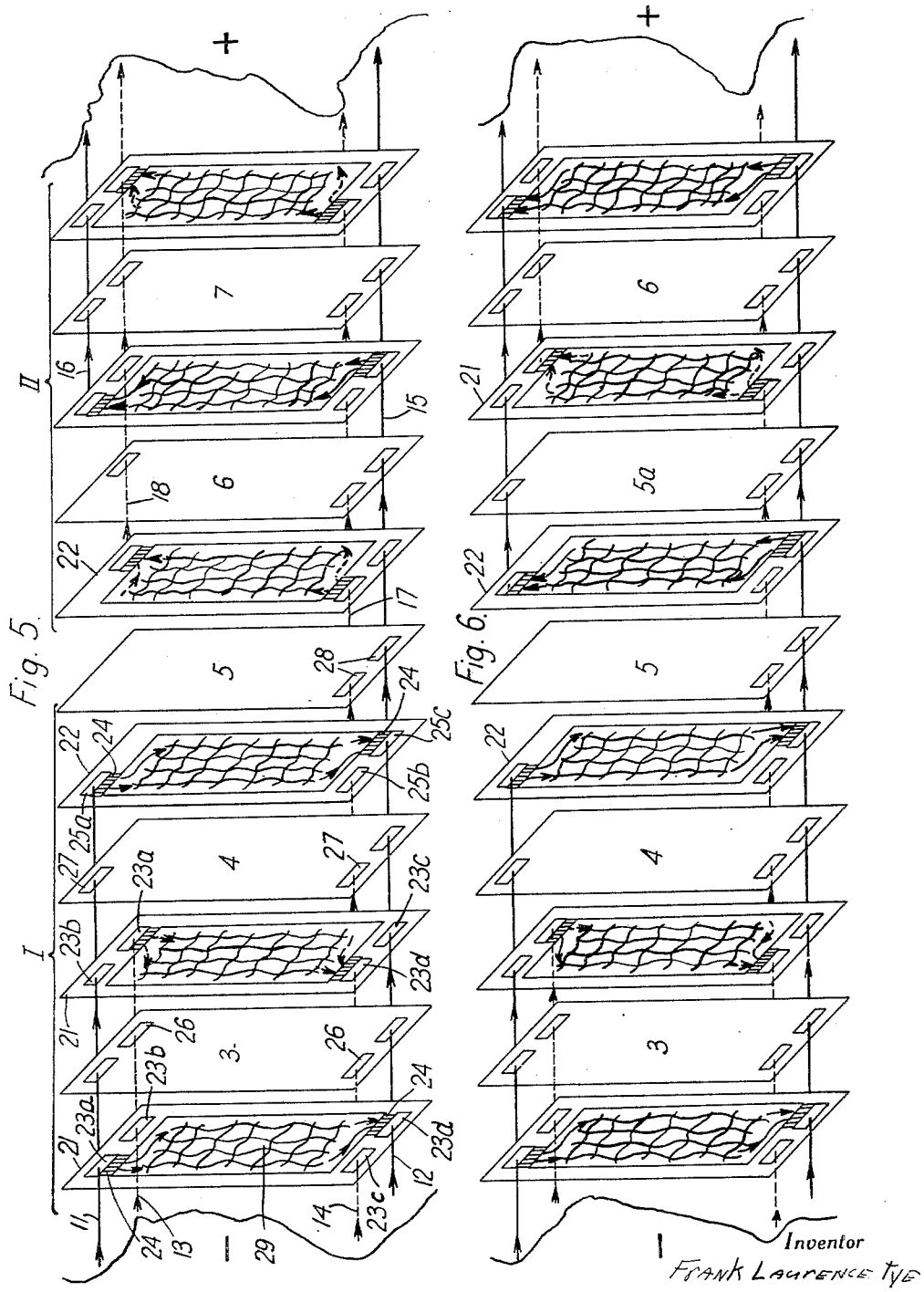

United States Patent Office 3,046,211
Patented July 24, 1962

3,046,211
ELECTRODIALYSING CELLS
Frank Laurence Tye, Pinner, England, assignor to
The Permutit Company Limited
Filed Dec. 21, 1959, Ser. No. 860,918
Claims priority, application Great Britain Mar. 12, 1958
3 Claims. (Cl. 204—180)

This invention relates to electrodialytic cells and to processes carried on therein. This application is a continuation-in-part of my application Serial No. 798,408 filed March 10, 1959, now abandoned.

It is known that if an electrodialytic cell is divided into compartments by membranes, each compartment being bounded on one side by a membrane selectively permeable to ions of one sign and on the opposite side by a membrane selectively permeable to ions of the other sign, cations and anions will migrate through the membranes selective to them but not through the other membranes. Therefore it is possible to remove dissolved salts from a solution by passing this through alternate compartments, a stream of a solution of an electrolyte being passed through the other compartments to provide an electrically conducting path and to receive the migrating ions.

In practice there is always some movement through the membranes in addition to the migration of ions under the influence of the electric current in the manner set forth above. This movement may take place by diffusion as a result of the natural tendency for substances to try to equalise their concentrations in solution. Both electrolytes and non-electrolytes may move through the membranes by diffusion. Movement of non-electrolytes (including water) through the membranes may also occur by electro-osmosis.

I have found that the conditions for preventing undesired movement through a membrane while maintaining high current efficiency and adequate desalting are critical. The undesired movement through the membrane can be reduced by maintaining a pressure difference across it. However, in a multi-compartment cell it is impossible to maintain a uniform pressure difference across all the membranes unless all the compartments through which each liquid flows are arranged in parallel, being fed from a common conduit and discharging to a common outlet. In practice this rarely leads to adequate desalting during a single passage of the liquid through the cell, so the problem cannot be solved merely by use of a cell with the compartments all in parallel and maintaining a uniform pressure difference across each membrane.

Adequate desalting of the electrolyte solution in a single passage through the cell may be obtained if the solution passes through a plurality of desalting compartments before leaving the cell. To allow this to occur the flow connections may be arranged so that the compartments are divided into groups, and in each group the flow of the desalting liquid is in parallel streams through all the compartments of the group, and the groups themselves are in series, that is to say, all the streams emerging from the compartments of a group are united into a single stream to flow to the next group and that stream is again divided to flow through the compartments of this next group as parallel streams. This arrangement is known as series-parallel.

Figure 2:
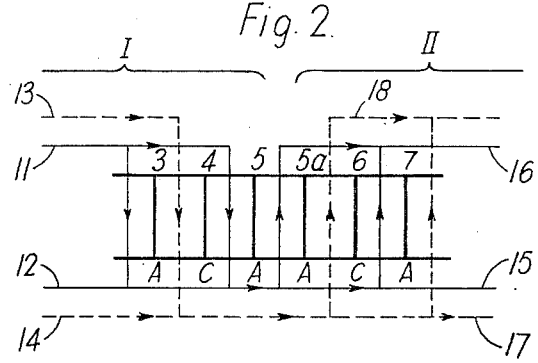
Figure 3:
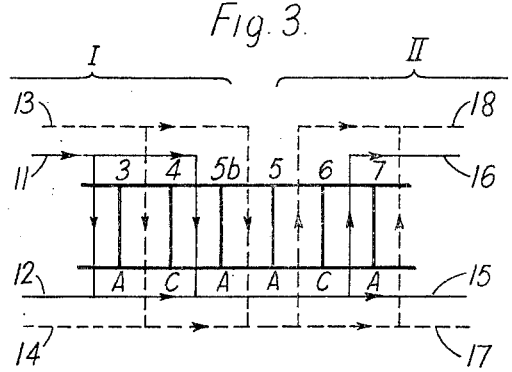
Figure 4:
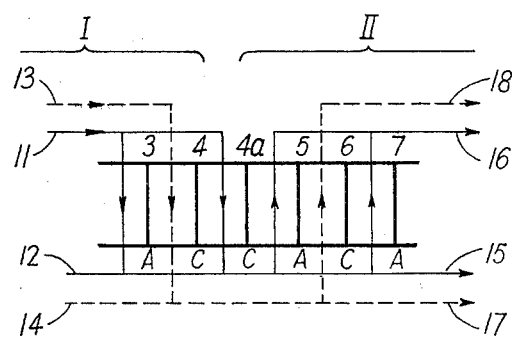

For a better understanding of this arrangement, and of the invention, reference is made to the accompanying drawings, in which:

FIGURE 1 is a diagrammatic representation of a cell with series-parallel flow;

FIGURES 2, 3 and 4 are diagrammatic representations of cells according to my invention; and FIGURES 5 and 6 are exploded views showing elements of the cells of FIGURES 1 and 2 respectively.

FIGURES 1 and 5 show a prior art cell with end electrode compartments 19 and 20, and a number of groups of compartments, of which only the adjacent compartments of two groups I and II are shown. The compartments shown are formed within rectangular spacers (or gaskets) of the conventional kind with open centres and are bounded on their main faces by membranes 0 to 10 which are alternately cation-selective (C) and anion-selective (A). The membranes form the boundary between the two groups. The spacers are of two kinds, 21 and 22, the latter being used as the end spacers in each group of compartments. The spacers 21 have two openings 23a and 23b in one side and similar openings 23c and 23d in the opposite side. The openings 23a and 23d communicate with the centre of the spacer through inserts 24 in which passages are made, but the openings 23b and 23c do not communicate with the open centre of the spacer.

The end spacers 22 have three openings, namely a single opening 25a in one side and two openings 25b and 25c in the other; the openings 25a and 25c communicate with the open centre of the spacer through inserts 24.

Alternate spacers 21 are reversed through 180° with respect to one another and alternate spacers 22 are similarly reversed.

Each membrane that lies between two spacers 21 has four openings 26 which register with the openings 23a—23d. Each membrane, such as that shown at 4, which lies between a spacer 21 and a spacer 22 has three openings 27. Each membrane, such as that shown at 5, which lies between two spacers 22 has two openings 28.

The open centre of each spacer is filled with a coarsewoven gauze of a plastic, shown at 29.

The anode and cathode may be of carbon, and the whole cell may be held together by bolts passing through end plates, the membranes and spacers being held in alignment by rods passing through holes in them, not shown in the drawings because these features are well known to those skilled in the art.

Conduits are formed through the cell by the registering openings. In operation, a liquid to be desalted enters as a stream 11 and flows (as shown by full lines) downwards through three compartments of the first group in parallel streams which are united in a discharge conduit to form a stream 12. The second or concentrating liquid, which is to receive ions from the first or desalting liquid, enters as a stream 13 and flows (as shown by dotted lines) downwards through three compartments of the same group in parallel streams which are united in a discharge conduit to form a stream 14. The stream 12 after passing through the membrane 5 becomes a supply stream 15 which is split up to flow through alternate compartments of the second group, the flow through these being upwards and the parallel streams that flow in these compartments uniting in a common discharge conduit to form a stream 16. The stream 14 after passing through the membrane 5 similarly becomes a supply stream 17 which is split up to flow through three compartments of the second group arranged in parallel, the streams that flow through these being united as a single discharge stream 18.

The streams are supplied to the cell by pumps, and the rate of flow of each stream and the pressure under which it flows can be regulated in various ways, e.g. by varying the pump speed and by adjusting valves in pipes through which the streams flow after leaving the cell, thereby varying the back pressure. In each liquid the pressure will be the same in each of the parallel compartments in a group but will be higher than that in each of the parallel compartments in the next group that receive the same liquid. If this were not so, no flow would take place. In other words, the pressure falls in stepwise fashion from group to group, and this is true of both liquids whether they are under the same or different pressures.

In practice there may be, say, 240 compartments, arranged in 6 groups of 20 for each liquid. Moreover the flows in adjacent compartments may be at right angles to one another instead of in the same direction as diagrammatically illustrated. Further, the compartments may be filled with ion-exchange materials.

Assume now that it is desired to maintain a greater pressure in each concentrating compartment than in the desalting compartments on either side. This may be desired, for instance, because the desalting liquid is a solution of a non-electrolyte such as glycerine contaminated by dissolved salts which are to be removed by the electrodialysis, and there is a tendency for the non-electrolyte to pass through the membranes into the concentrating liquid. If the liquid containing the non-electrolyte is passed through the cell under a pressure lower than that on the other liquid, the tendency in question will be opposed by the pressure difference. The amount of this pressure difference is important. If it is too small the flow through the membranes will not sufficient to overcome the undesirable processes of diffusion or electro-osmosis or both. On the other hand, if the pressure difference is high, the flow through the membranes will also be high. In addition to stopping the undesirable losses from the desalting stream by diffusion or electro-osmosis, the high flow also re-introduces into the desalting stream dissolved salts from the concentrating stream, so that the rate of salt removal from the desalting to the concentrating stream is reduced. In other words, the current efficiency falls.

It is clear, therefore, that there will be an optimum rate of flow through the membranes from the concentrating liquid to the desalting liquid with any given liquids in any given cell. It is obviously desirable to try to attain this flow rate in all parts of the cell, and this means that the pressure difference across the membranes must be fairly uniform throughout the cell. Now in a cell arranged as shown in FIGURES 1 and 5 it is possible, by adjustment of flow rates and valves, to arrange that the same pressure difference exists between the streams 13 and 11 as between the streams 14 and 12, 17 and 15 and 18 and 16, so that the pressure difference across the membranes 0 to 4 and 6 to 10 is the same. However the pressure difference across the membrane 5 is different, since it is bounded on one side by a compartment of the first group and on the other by a compartment of the second group, which is further downstream and therefore at a lower pressure than that of the first group. Therefore there will be flow from the concentrating compartment between the membranes 5 and 6 to the desalting compartment between the membranes 4 and 5 at a rate that is not the optimum.

The main object of my invention is to provide a cell in which this drawback is avoided.

Another object is to provide improved electrodialytic processes.

In my invention the regular alternation of anion-selective and cation-selective membranes is interrupted at the point where one group joins the next and there two membranes of one kind are put next to one another. In other words a compartment bounded on both sides by membranes selective to ions of the same sign is provided between adjacent groups. Such a compartment is virtually a "no-change" compartment in that no concentration or depletion will occur while the electrolyte solution is passing through the compartment. The "no-change" compartment may receive either liquid, and it is connected in parallel with the compartments in one of the groups through which this liquid flows, so as to become in effect the end compartment of that group. The end compartment of the adjacent group must receive the same liquid, since it is between these two compartments that there is an abnormal pressure difference, and such a pressure difference across a membrane between compartments containing the same liquid does no harm.

A cell acocrding to the invention is diagrammatically illustrated in FIGURES 2 and 6. The additional membrane is shown at 5a and is an anion-selective membrane. The compartment between the membranes 5 and 5a is the no-change compartment, and is connected in parallel with the desalting compartments of group II. The membrane 5 is that across which there is an abnormal pressure difference.

As an illustrative example of the benefits obtained by means of the invention, two cells were constructed, namely a cell A as illustrated by FIGURE 1 and a cell B as illustrated by FIGURE 3.

The cell A contained 121 anion-selective membranes alternating with 121 cation-selective membranes, adjacent membranes being kept apart by spacers, each 0.05" thick, and made of plasticised polyvinyl chloride. The membranes were of the heterogeneous type, the anion-selective membranes comprising quaternary ammonium groups as ion-exchange groups and the cation-selective membranes comprising sulphonic groups as the ion-exchange groups. The transport number of the anion-selective membranes for chloride ions was 0.85 and that of the cation-selective membranes was 0.10. The spacers were in the form of square frames, with open centres 20 inches square and each open centre was filled with a sheet of plastic gauze.

The desalting and concentrating compartments were each divided into groups, each group comprising six compartments connected in parallel. Each group was connected in series with its neighbor as shown in FIGURE 1. A carbon anode and a carbon cathode were placed at the two ends and each was separated from the main cell pack by an additional or electrode compartment.

The cell B was the same as cell A except that at each of the points where series connection between groups was made an extra compartment and anion-selective membrane was added. The additional compartment was bounded on both sides by an anion-selective membrane and was connected in parallel with the concentrating compartments in the group nearer to the cathode. Thus the groups consisted of seven concentrating compartments with six desalting compartments interspersed alternately between them.

In each cell a solution containing 10% NaCl and 10% glycerine in water was separately passed through the desalting compartments from the cathode to the anode end. A 1% NaCl solution was passed concurrently through the concentrating compartments and separately through the electrode compartments. A current of 39 amps. was passed through each cell and the rate of flow of solution to the desalting compartments adjusted so that the effluent from these compartments contained only 1% NaCl. Under these conditions both cells delivered 19 gal./hr. of liquor, which corresponds to a current efficiency of 75%. The rate of flow of the concentrating stream was such that there was zero pressure difference between the concentrating and desalting streams at the inlets and outlets to the cells. In cell A the flow rate of the concentrating stream was 19 gallon/hour and in cell B it was 22 gallon/hour. The effluents were analysed for glycerine and it was found that in both cells 18% of the glycerine had been lost to the concentrating stream during the desalting. These facts show clearly substantial loss of glycerine in the absence of any pressure difference.

A back pressure was next applied at the outlets of the concentrating streams in each cell so that a pressure difference of 2 lbs./sq. in was established between the concentrating and desalting streams at the inlets and outlets. It was found necessary to decrease slightly the flow rates through the desalting compartments to 18.5 gallon/hour in order to keep the effluent concentration at 1% NaCl; this represents a drop in current efficiency to 73%. Analysis of the glycerine contents of the effluents showed that the percentage loss of glycerine had been reduced to 1% in cell B but only to 4% in cell A. Subsequent runs showed that it was possible to reduce the loss of glycerine to 1% in Cell A (the cell of conventional design) by increasing the concentrating stream pressure to 3 lb. per square inch above that of the desalting stream. However, under these conditions the current efficiency was only 60% so that the product rate was reduced to 15 gallon/hour. It is therefore clear that by using the invention less glycerine was lost at the same current efficiency, or at the same glycerine loss the current efficiency (or the rate of production of an identical product) was higher.

The invention is applicable whenever it is desired to control the communication between the two streams in cells in which the patterns of the concentrating and desalting streams are identical. It is useful not only in the separation of electrolyte and non-electrolyte but also in cells containing ion-exchange materials as the high ratio of concentration in the salty stream to that in the desalting stream, normally attained in cells of the kind to which the invention relates, makes it undesirable for any flow to occur from the concentrating to the desalting stream.

I claim:

1. In an electrodialytic cell comprising end electrodes, a plurality of compartments between the electrodes, each compartment being bounded on one side by a membrane selectively permeable to ions of one sign and on the opposite side by a membrane selectively permeable to ions of the other sign, and passage-forming means for the flow of one liquid through alternate compartments and of a second liquid through the remaining compartments, said means dividing each liquid into streams flowing in parallel through the compartments of a plurality of groups of compartments and in series through the groups, the improvement which comprises the provision between adjacent groups of a compartment bounded on both sides by membranes selective to ions of the same sign, connected in parallel with the compartments of one of the adjacent groups and connected to receive the same stream as the adjacent compartment of the other of these two groups.

2. In an electrodialytic process in which two liquids flow under different pressures through alternate compartments of a cell bounded on one side by a membrane selectively permeable to ions of one sign and on the other side by membranes selectively permeable to ions of the other sign, the steps of dividing each liquid into parallel streams flowing through a group of compartments, reuniting the streams of each liquid, dividing each liquid into parallel streams flowing through a second group of compartments, and causing a portion of the stream flowing through one of the groups to flow through a compartment interposed between said groups and bounded on both sides by membranes selectively permeable to ions of the same sign and in immediate contiguity with a portion of the stream of the same liquid through the other group.

3. A process as claimed in claim 2 in which one liquid contains a non-electrolyte and is passed through the cell under a pressure lower than that on the other liquid.

References Cited in the file of this patent

UNITED STATES PATENTS

| | | |
|---|---|---|
| 2,140,341 | Wallach et al. | Dec. 13, 1938 |
| 2,277,091 | Feyens | Mar. 24, 1942 |
| 2,694,680 | Katz et al. | Nov. 16, 1954 |
| 2,810,686 | Bodamer et al. | Oct. 22, 1957 |

FOREIGN PATENTS

| | | |
|---|---|---|
| 210,813 | Australia | Oct. 23, 1957 |